United States Patent
Yu et al.

(10) Patent No.: US 11,789,448 B1
(45) Date of Patent: Oct. 17, 2023

(54) METHOD, DEVICE, EQUIPMENT AND MEDIUM FOR DYNAMIC POSITIONING OF SEMI-SUBMERSIBLE OFFSHORE PLATFORM

(71) Applicant: Guangdong Ocean University, Zhanjiang (CN)

(72) Inventors: Guoyan Yu, Zhanjiang (CN); Qiheng Zhu, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/313,641

(22) Filed: May 8, 2023

Related U.S. Application Data

(63) Continuation of application No. PCT/CN2022/143383, filed on Dec. 29, 2022.

(30) Foreign Application Priority Data

Jan. 5, 2022 (CN) .......................... 202210005601.6

(51) Int. Cl.
*G05D 1/02* (2020.01)
*B63H 21/21* (2006.01)
(Continued)

(52) U.S. Cl.
CPC .......... *G05D 1/0206* (2013.01); *B63B 79/20* (2020.01); *B63B 79/30* (2020.01); *B63H 21/21* (2013.01); *G01L 5/133* (2013.01)

(58) Field of Classification Search
CPC ...... G05D 1/0206; B63B 79/20; B63B 79/30; B63H 21/21; G01L 5/133
See application file for complete search history.

(56) References Cited

U.S. PATENT DOCUMENTS 3,556,033 A * 1/1971 Bonnafous .......... B63B 35/4413
114/144 R
6,450,112 B1 9/2002 Deguhee
(Continued)

FOREIGN PATENT DOCUMENTS

CN 102508431 A 6/2012
CN 102707625 A 10/2012
(Continued)

OTHER PUBLICATIONS

Zhao et al, Adaptive Sliding Mode Dynamic Positioning Control for a Semi-Submersible Offshore Platform, IEEE, 2019 18th European Control Conference (ECC), Jun. 2019, pp. 3103-3108. (Year: 2019).*

*Primary Examiner* — Russell Frejd
(74) *Attorney, Agent, or Firm* — Kaplan Breyer Schwarz, LLP; Stuart H. Mayer

(57) ABSTRACT

Disclosed are a method, a device, equipment and a medium for dynamic positioning of a semi-submersible offshore platform. The method includes: acquiring a real-time position of the platform; if the real-time position is different from a preset position, detecting an external force torque by a first torque detector; calculating a first target thrust produced by each of propellers, controlling the propellers to produce forces according to a first target thrust torque, and detecting an actual thrust torque; obtaining a fault condition of each of the propellers if the actual thrust torque is different from the first target thrust torque, indicating that the propellers have faults; recalculating a thrust of each of the propellers, a second target thrust torque, according to the fault condition, the external force torque and the preset formula set; and controlling each of the propellers to generate the thrust according to a corresponding second target thrust torque.

8 Claims, 4 Drawing Sheets

(51) Int. Cl.
  G01L 5/13    (2006.01)
  B63B 79/20   (2020.01)
  B63B 79/30   (2020.01)

(56) References Cited

U.S. PATENT DOCUMENTS

| | | | |
|---|---|---|---|
| 7,985,108 B1* | 7/2011 | Bekker | B63B 35/44 |
| | | | 440/5 |
| 11,435,722 B2* | 9/2022 | Moreno | E21B 41/0007 |
| 2016/0185434 A1 | 6/2016 | Hirst | |
| 2021/0223747 A1* | 7/2021 | Wang | G06N 3/084 |
| 2023/0129913 A1* | 4/2023 | Liu | B63B 79/20 |
| | | | 702/141 |

FOREIGN PATENT DOCUMENTS

| | | |
|---|---|---|
| CN | 104090497 A | 10/2014 |
| CN | 104267606 A | 1/2015 |
| CN | 106527133 A | 3/2017 |
| CN | 109240316 A | 1/2019 |
| CN | 111452933 A | 7/2020 |
| CN | 112558472 A | 3/2021 |
| CN | 113009824 A | 6/2021 |
| CN | 113126503 A | 7/2021 |
| CN | 114194347 A | 3/2022 |
| JP | 2001219899 A | 8/2001 |
| JP | 2020082890 A | 10/2019 |

* cited by examiner

METHOD, DEVICE, EQUIPMENT AND MEDIUM FOR DYNAMIC POSITIONING OF SEMI-SUBMERSIBLE OFFSHORE PLATFORM

CROSS-REFERENCE TO RELATED APPLICATIONS

This application is a continuation of PCT/CN2022/143383, filed on Dec. 29, 2022, and claims priority to Chinese Patent Application No. 202210005601.6, filed on Jan. 5, 2022, the contents of which are hereby incorporated by reference.

TECHNICAL FIELD

The application relates to the field of waterway control, and in particular to a method, a device, equipment and a medium for dynamic positioning of a semi-submersible offshore platform.

BACKGROUND

With a development of economy, deep-sea oil and gas has become one of important exploitable resources, and a semi-submersible offshore platform is often used for exploitation of the deep-sea oil and gas.

During the exploitation of deep-sea oil and gas resources based on the semi-submersible offshore platform, when the semi-submersible offshore platform is disturbed by an external environment of wind and waves, propellers of the semi-submersible offshore platform are controlled to generate a corresponding reaction force to offset an external environmental interference and ensure that the semi-submersible offshore platform is stably maintained at a target position.

However, when the propellers are controlled to generate the reaction force, if the propellers fail and an expected reaction force may not be generated, a stability of the semi-submersible offshore platform and resource extraction may be affected to some extent.

SUMMARY

In view of this, the application provides a method, a device, equipment and a medium for dynamic positioning of a semi-submersible offshore platform, so as to improve a present situation that a stability of the semi-submersible offshore platform and resource exploitation may be affected to some extent when propellers fail to generate an expected reaction force.

In a first aspect, an embodiment of the application provides a dynamic positioning method of a semi-submersible offshore platform, where a first torque detector, a second torque detector and a preset number of propellers are arranged in the semi-submersible offshore platform, and the method including:

acquiring a real-time position of the semi-submersible offshore platform;

if the real-time position is different from a preset position, detecting an external force torque of the semi-submersible offshore platform by using the first torque detector;

determining a corresponding first target thrust torque of each of the propellers according to the external force torque and a preset formula set;

controlling each of the propellers to generate a thrust according to the corresponding first target thrust torque, and detecting an actual thrust torque of each of the propellers by using the second torque detector;

if an actual thrust torque of at least one of the propellers is different from a corresponding first target thrust torque, obtaining a fault condition of each of the propellers, where the fault condition is obtained by the actual thrust torque and the corresponding first target thrust torque;

calculating a corresponding second target thrust torque of each of the propellers according to the fault condition of each of the propellers, the external force torque and the preset formula set; and controlling each of the propellers to push according to the corresponding second target thrust torque, making the actual thrust torque of each of the propellers the same as the corresponding first target thrust torque, and making the real-time position the same as the preset position.

Optionally, in an implementation provided by the embodiment of the application, the preset formula set includes a thrust distribution model, a dynamic positioning model and a virtual observer model;

before determining the corresponding first target thrust torque of each of the propellers according to the external force torque and the preset formula set, the method includes:

constructing the thrust distribution model based on a position of each of the propellers;

constructing the dynamic positioning model corresponding to the semi-submersible offshore platform according to a three-degree-of-freedom dynamic positioning ship modeling principle;

determining the virtual observer model based on the dynamic positioning model, where the virtual observer model is used for estimating a speed and a position of the semi-submersible offshore platform; and updating the virtual observer model by using a preset neural network model to compensate an uncertainty in the virtual observer model.

Further, in the implementation provided by the embodiments of the application, the thrust distribution model includes:

$$\tau = T(\alpha)Kf$$

$$T(\alpha) = \begin{bmatrix} \cos(\alpha_i) \\ \sin(\alpha_i) \\ l_{xi}\sin(\alpha_i) - l_{yi}\cos(\alpha_i) \end{bmatrix}$$

$$K = \text{diag}(\lambda_1, \lambda_2, \ldots \ldots, \lambda_r)$$

$$\lambda_r = \frac{f_{il}}{f_i},$$

where, $\tau$ represents a control rate used for determining the corresponding first target thrust torque and the corresponding second target thrust torque of each of the propellers; $T(\alpha)$ represents a configuration matrix of the preset number of propellers; K represents a fault condition matrix of the preset number of propellers; f represents a target thrust matrix, and the target thrust matrix represents the corresponding first target thrust torque or the corresponding second target thrust torque of each of the propellers; $\alpha_i$ represents an azimuth of an i-th propeller; $l_{xi}$ and $l_{yi}$ respectively represent an abscissa and an ordinate of the i-th propeller; diag represents a diagonal matrix; $\lambda_r$ represents the fault condition of each of the propellers, and $\lambda_r$ defaults to 1; and $f_{i1}$ and $f_i$ respectively represent an actual thrust torque and a corresponding first target thrust torque of the i-th propeller.

The dynamic positioning model includes:

$$\begin{cases} M\dot{v} + Dv = \tau - d \\ \dot{\eta} = J(\varphi)v \end{cases}$$

$$\dot{\eta} = [xy\varphi]^T$$

$$v = [\overline{u}\overline{v}\overline{r}]^T,$$

where M and D represent an inertia matrix and a damping matrix respectively; $\dot{\eta}$ and $\eta$ both represent a position of the semi-submersible offshore platform in an earth coordinate system; x and y respectively represent an abscissa and an ordinate of the semi-submersible offshore platform in the earth coordinate system; φ represents a heading angle of the semi-submersible offshore platform; v represents the speed of the semi-submersible offshore platform; $\overline{u}$, $\overline{v}$ And $\overline{r}$ respectively represent a pitching speed, a swaying speed and a yawing speed of the semi-submersible offshore platform in a platform coordinate system; d represents the external force torque; and J(φ) represents a Jacobian matrix.

The virtual observer model includes:

$$\dot{\hat{x}} = A\hat{x} + B\tau + H(y - \hat{x})$$

$$A = \begin{bmatrix} 0 & 1 \\ 0 & a \end{bmatrix}$$

$$B = \begin{bmatrix} 0 \\ b \end{bmatrix}$$

$$y = x,$$

where, $\hat{F}$ represents the uncertainty; H is a gain vector of the virtual observer model; $\hat{x}$ represents an estimation vector corresponding to an estimated position and an estimated speed of the semi-submersible ocean; A represents an estimator coefficient matrix; a represents a state quantity coefficient matrix; B represents an estimated input coefficient matrix; b represents an input matrix; and y represents a vector corresponding to the position and the speed of the semi-submersible offshore platform.

Further, in the implementation provided by the embodiments of the application, if the actual thrust torque of at least one of the propellers is different from the corresponding first target thrust torque, obtaining the fault condition of each of the propellers includes:

if the actual thrust torque of at least one of the propellers is different from the corresponding first target thrust torque, updating the fault condition matrix according to the actual thrust torque and the corresponding first target thrust torque of each of the propellers to obtain fault conditions of the propellers.

Further, in the implementation provided by the embodiments of the application, the preset neural network model includes a radial basis function neural network model.

Further, in the implementation provided by the embodiments of the application, before updating the virtual observer model with the preset neural network model, the method includes:

determining an adaptability of the preset neural network model according to the dynamic positioning model and the virtual observer model.

Updating the virtual observer model by using the preset neural network model includes:

updating the virtual observer model by using the preset neural network model based on the adaptability.

Optionally, in the implementation provided by the embodiments of the application, if the actual thrust torque of at least one of the propellers is different from the corresponding first target thrust torque, after obtaining the fault condition of each of the propellers, the method further includes:

recording the fault condition of each of the propellers.

In a second aspect, an embodiment of the application provides a dynamic positioning device of a semi-submersible offshore platform, where a first torque detector, a second torque detector and a preset number of propellers are arranged in the semi-submersible offshore platform, and the device including:

a position acquisition module, configured to acquire a real-time position of the semi-submersible offshore platform;

a force detection module, configured to detect an external force torque of the semi-submersible offshore platform by using the first torque detector if the real-time position is different from a preset position;

a first torque calculation module, configured to determine a corresponding first target thrust torque of each of the propellers according to the external force torque and a preset formula set;

a first control module, configured to control each of the propellers to generate a thrust according to the corresponding first target thrust torque, and detecting an actual thrust torque of each of the propellers by using the second torque detector;

a fault detection module, configured to obtain a fault condition of each of the propellers if an actual thrust torque of at least one of the propellers is different from a corresponding first target thrust torque, where the fault condition is obtained from the actual thrust torque and the corresponding first target thrust torque;

a second torque calculation module, configured to calculate a corresponding second target thrust torque of each of the propellers according to the fault condition of each of the propellers, the external force torque and the preset formula set; and a second control module, configured to control each of the propellers to push according to the corresponding second target thrust torque, making the actual thrust torque of each of the propellers the same as the corresponding first target thrust torque, and making the real-time position the same as the preset position.

In a third aspect, an embodiment of the application provides a computer device, including a memory and a processor, where the memory stores a computer program, and when the computer program runs on the processor, any dynamic positioning method of a semi-submersible offshore platform as disclosed in the first aspect is executed.

In a fourth aspect, an embodiment of the application provides a computer-readable storage medium, where a computer program is stored on the computer-readable storage medium, and when the computer program runs on a processor, any dynamic positioning method of a semi-submersible offshore platform as disclosed in the first aspect is executed.

A dynamic positioning method of the semi-submersible offshore platform provided by the embodiment of the application includes following steps: firstly, acquiring a real-time position of the semi-submersible offshore platform; then if the real-time position is different from a preset position, detecting an external force torque of the semi-submersible offshore platform by using a first torque detector, that is, detecting an external force of the semi-submersible offshore platform; then, calculating a thrust that each of the propellers should produce, that is, the first target thrust torque according to the external force torque and a preset formula set; further, controlling each of the propellers to generate the thrust according to a corresponding first target thrust torque, and detecting an actual thrust torque of each of the propellers by a second torque detector, that is, detecting whether the actual thrust of each of the propellers is the same as a target thrust to judge whether the propellers are faulty; if an actual thrust torque of at least one of the propellers is different from a corresponding first target thrust torque, that is, the propellers are faulty, obtaining a fault condition of each of the propellers, that is, determining a difference between the actual thrust torque of each of the propellers and the corresponding first target thrust torque; then, according to the fault condition of each of the propellers, the external force torque and the preset formula set, recalculating the thrust of each of the propellers, making the thrust generated by each of the propellers the same as the target thrust, that is, making the actual thrust torque the same as the first target thrust torque; finally, controlling each of the propellers to push according to a corresponding second target thrust torque, making the actual thrust torque of each of the propellers the same as the corresponding first target thrust torque, and making the real-time position the same as the preset position, thus completing a thrust redistribution of the propellers and dynamic positioning of the semi-submersible offshore platform.

Therefore, in the embodiment of the application, the external force of the semi-submersible offshore platform is directly measured through the first torque detector, thus ensuring an accuracy of a subsequent calculation of the first target thrust torque and the second target thrust torque. Moreover, the fault condition of each of the propellers is determined by the first target thrust torque and the actual thrust torque of each of the propellers detected by the second torque detector, and the target thrust is recalculated according to the fault condition, that is, the thrust is redistributed, so that the semi-submersible offshore platform may be positioned even when the propellers are faulty, and the stability of the semi-submersible offshore platform and a smooth exploitation of resources are ensured.

BRIEF DESCRIPTION OF THE DRAWINGS

In order to explain technical schemes of the application more clearly, drawings needed in embodiments may be briefly introduced below. It should be understood that the following drawings only show some embodiments of the application, so they should not be regarded as limiting a scope of protection of the application. In the drawings, like components are given like numerals.

DETAILED DESCRIPTION OF THE EMBODIMENTS

Figure 1:
FIG. 1 shows a flow chart of a first dynamic positioning method of a semi-submersible offshore platform provided by an embodiment of the application.

In the following, technical schemes in embodiments of the application may be described clearly and completely with attached drawings. Obviously, the described embodiments are only a part of the embodiments of the application, but not all the embodiments.

Components of the embodiments of the application generally described and illustrated in the drawings herein may be arranged and designed in various different configurations. Therefore, the following detailed description of the embodiments of the application provided in the accompanying drawings is not intended to limit a scope of the claimed application, but merely represents selected embodiments of the application. Based on the embodiments of the application, all other embodiments obtained by those skilled in the art without a creative work belong to a scope of protection of the application.

Hereinafter, terms "including", "having" and their cognates that may be used in various embodiments of the application are only intended to indicate specific features, numbers, steps, operations, elements, components or combinations of the foregoing items, and should not be understood as first excluding an existence of one or more other features, numbers, steps, operations, elements, components or combinations of the foregoing items or as increasing a possibility of one or more features, numbers, steps, operations, elements, components, or combinations of the foregoing items.

In addition, terms "first", "second" and "third" are only used to distinguish descriptions and may not be understood as indicating or implying a relative importance.

Unless otherwise defined, all the terms (including technical terms and scientific terms) used herein have same meanings as commonly understood by ordinary people in the field to which various embodiments of the application belong. The terms (such as those defined in commonly used dictionaries) may be interpreted as having same meanings as contextual meanings in the related technical field and may not be interpreted as having idealized meanings or overly formal meanings unless clearly defined in various embodiments of the application.

With Reference to FIG. 1, a flow chart of a first dynamic positioning method of a semi-submersible offshore platform provided by the embodiments of the application is shown in FIG. 1. In the dynamic positioning method of the semi-submersible offshore platform provided by the embodiments of the application, a first torque detector, a second torque detector and a preset number of propellers are arranged in the semi-submersible offshore platform.

It should be understood that in the embodiments of the application, an external environmental interference received by the semi-submersible offshore platform, that is, an external force torque, is detected through the first torque detector. Understandably, a torque is a physical quantity to measure a rotation effect of a force on an object. The greater the torque, the more obvious the rotation effect on the object.

For the semi-submersible offshore platform, the greater the external environmental interference received by the semi-submersible offshore platform, a position and a direction of the semi-submersible offshore platform may be fixed, that is, the semi-submersible offshore platform may rotate.

Therefore, in the embodiments of the application, an external force of the semi-submersible offshore platform, that is, the external force torque is directly detected through the first torque detector, and then the external environmental interference received by the semi-submersible offshore platform is accurately described, so that a thrust of each of the propellers may be accurately calculated through the external force torque in the future.

In one possible way, the first torque detector includes an inertial measuring instrument.

It should also be understood that in the embodiments of the application, a second torque detector for detecting an actually generated thrust of each of the propellers is also provided, so that whether the thrust generated by each of the propellers may effectively eliminate the external environmental interference, that is, whether resultant forces of all the propellers may offset the external force may be effectively determined.

Based on this, the dynamic positioning method of the semi-submersible offshore platform provided by the embodiments of the application includes following steps.

S110, a real-time position of the semi-submersible offshore platform is acquired.

In a feasible way, in the embodiments of the application, the real-time position of the semi-submersible offshore platform is obtained through a GPS (global positioning system) and a gyrocompass installed in the semi-submersible offshore platform.

It may be understood that a device and/or a method to obtain the real-time position of the semi-submersible offshore platform may be set according to an actual situation, and the embodiments of the application are not limited.

S120, if the real-time position is different from a preset position, the external force torque of the semi-submersible offshore platform is detected by using the first torque detector.

That is, when the real-time position is different from an expected stopping position of the semi-submersible offshore platform or deviates from an expected trajectory, the first torque detector may be controlled to detect the external force torque, that is, to determine the external force of the semi-submersible offshore platform.

Understandably, the real-time position is different from the preset position indicates that the external force of the semi-submersible offshore platform is too large, leading to deviation of the semi-submersible offshore platform from the expected position/trajectory, thereby affecting exploitation of deep-sea oil and gas resources. Therefore, when the real-time position is different from the preset position, the external force of the semi-submersible offshore platform needs to be detected, so the propellers of the semi-submersible offshore platform are controlled to generate reaction forces that may offset the external force to make the real-time position of the semi-submersible offshore platform consistent with the preset position.

S130, a corresponding first target thrust torque of each of the propellers is determined according to the external force torque and a preset formula set.

That is, in order to offset the external force torque of the semi-submersible offshore platform, a reaction force of each of the propellers, that is, a first target thrust torque, is calculated through the preset formula set.

It may be understood that a way to calculate each of the propellers according to the external force of the semi-submersible offshore platform may be set according to the actual situation, that is, the preset formula set may be set according to the actual situation.

Optionally, in a feasible way provided by the embodiments of the application, the preset formula set includes a thrust distribution model, a dynamic positioning model and a virtual observer model.

Based on this, before the S130, the method further includes:

constructing the thrust distribution model based on a position of each of the propellers;

constructing the dynamic positioning model corresponding to the semi-submersible offshore platform according to a three-degree-of-freedom dynamic positioning ship modeling principle;

determining the virtual observer model based on the dynamic positioning model, where the virtual observer model is used for estimating a speed and a position of the semi-submersible offshore platform; and updating the virtual observer model by using a preset neural network model to compensate an uncertainty in the virtual observer model.

That is, in the embodiments of the application, the first target thrust torque of each of the propellers is solved through the thrust distribution model, the dynamic positioning model and the virtual observer model.

It should be understood that when calculating the first target thrust torque of each of the propellers, in addition to considering the external force of the semi-submersible offshore platform, the position and the speed of the semi-submersible offshore platform are also need to be considered. Although a real-time speed may be obtained by the GPS and the gyrocompass, an accuracy is difficult to guarantee and an accurate calculation may not be ensured, and a difficulty and a cost of accurately obtaining the position and the speed are high. Therefore, in this implementation of the embodiments of the application, the speed and the position of the semi-submersible offshore platform are estimated through the virtual observer model to ensure a calculation accuracy of a first target thrust.

However, an introduction of the virtual observer model may also bring some calculation errors and modeling errors, and the virtual observer model also needs to consider the external interference. An existence of the calculation errors, the modeling errors and the external interference may lead to some errors in the speed and the position of the semi-submersible offshore platform output by the virtual observer model, thus leading to the uncertainty in the virtual observer model and affecting the calculation of the first target thrust. Therefore, in the embodiments of the application, the virtual observer model is updated by presetting the neural network model to compensate the uncertainty in the virtual observer model.

Further, in an implementation provided by the embodiments of the application, the thrust distribution model includes:

$$\tau = T(\alpha)Kf$$

$$T(\alpha) = \begin{bmatrix} \cos(\alpha_i) \\ \sin(\alpha_i) \\ l_{xi}\sin(\alpha_i) - l_{yi}\cos(\alpha_i) \end{bmatrix}$$

-continued
$$K = \text{diag}(\lambda_1, \lambda_2, \ldots \ldots, \lambda_r)$$
$$\lambda_r = \frac{f_{i1}}{f_i},$$

where $\tau$ represents a control rate used for determining the corresponding first target thrust torque and a corresponding second target thrust torque of each of the propellers; $T(\alpha)$ represents a configuration matrix of the preset number of propellers; K represents a fault condition matrix of the preset number of propellers; f represents a target thrust matrix, and the target thrust matrix represents the corresponding first target thrust torque or the corresponding second target thrust torque of each of the propellers; $\alpha_i$ represents an azimuth of an i-th propeller; $l_{xi}$ and $l_{yi}$ respectively represent an abscissa and an ordinate of the i-th propeller; diag represents a diagonal matrix; $\mu_r$ represents the fault condition of each of the propellers, and $\lambda_r$ defaults to 1; and $f_{i1}$ and $f_i$ respectively represent an actual thrust torque and a corresponding first target thrust torque of the i-th propeller.

The dynamic positioning model includes:

$$\begin{cases} M\dot{v} + Dv = \tau - d \\ \dot{\eta} = J(\varphi)v \end{cases}$$
$$\dot{\eta} = [xy\varphi]^T$$
$$v = [\bar{u}\bar{v}\bar{r}]^T,$$

where M and D represent an inertia matrix and a damping matrix respectively; $\dot{\eta}$ and $\eta$ both represent a position of the semi-submersible offshore platform in an earth coordinate system; x and y respectively represent an abscissa and an ordinate of the semi-submersible offshore platform in the earth coordinate system; $\varphi$ represents a heading angle of the semi-submersible offshore platform; v represents the speed of the semi-submersible offshore platform; $\bar{u}$, $\bar{v}$ and $\bar{r}$ respectively represent a pitching speed, a swaying speed and a yawing speed of the semi-submersible offshore platform in a platform coordinate system; d represents the external force torque; and $J(\varphi)$ represents a Jacobian matrix.

The virtual observer model includes:

$$\dot{\hat{x}} = A\hat{x} + B\tau + H(y - \hat{x})$$
$$A = \begin{bmatrix} 0 & 1 \\ 0 & a \end{bmatrix}$$
$$B = \begin{bmatrix} 0 \\ b \end{bmatrix}$$
$$y = x,$$

where, $\bar{F}$ represents the uncertainty; H is a gain vector of the virtual observer model; $\bar{x}$ represents an estimation vector corresponding to an estimated position and an estimated speed of the semi-submersible ocean; A represents an estimator coefficient matrix; a represents a state quantity coefficient matrix; B represents an estimated input coefficient matrix; b represents an input matrix; and y represents a vector corresponding to the position and the speed of the semi-submersible offshore platform, where, the gain vector H may be expressed as:

$$H = \left[\frac{\alpha_1}{\varepsilon}, \frac{\alpha_2}{\varepsilon}\right]$$
$$\alpha_1, \alpha_2 > 0$$
$$1 > \varepsilon > 0.$$

In order to better explain the virtual observer model provided by the embodiments of the application, a derivation process of the virtual observer model is as follows.

A formula (1) refers to the Jacobian matrix represented by $J(\varphi)$ in the dynamic positioning model, and structures of $J(\varphi)$ may be expressed by a formula (2), a formula (3) and a formula (4):

$$\begin{cases} M\dot{v} + Dv = \tau - d \\ \eta = J(\varphi)v \end{cases} \tag{1}$$

$$J(\varphi) = \begin{bmatrix} \cos(\varphi) & -\sin(\varphi) & 0 \\ \sin(\varphi) & \cos(\varphi) & 0 \\ 0 & 0 & 1 \end{bmatrix} \tag{2}$$

$$J^{-1}(\varphi) = \begin{bmatrix} \cos(\varphi) & \sin(\varphi) & 0 \\ -\sin(\varphi) & \cos(\varphi) & 0 \\ 0 & 0 & 1 \end{bmatrix} \tag{3}$$

$$\dot{j}(\varphi) = \begin{bmatrix} -\sin(\varphi)\dot{\varphi} & -\cos(\varphi)\dot{\varphi} & 0 \\ \cos(\varphi)\dot{\varphi} & -\sin(\varphi)\dot{\varphi} & 0 \\ 0 & 0 & 0 \end{bmatrix}. \tag{4}$$

Since $J(\varphi)$ is nonsingular for all y, a formula (5) is obtained:

$$\dot{j}^{-1}(\varphi) = -J^{-1}(\varphi)\dot{j}(\varphi)J^{-1}(\varphi) \tag{5}$$

According to the formula (1), v may be expressed as:

$$v = J^{-1}(\varphi)\dot{\eta} \tag{6}$$

The formula (6) is derived to yield:

$$\dot{v} = \dot{j}^{-1}(\varphi)\dot{\eta} + J^{-1}(\varphi)\ddot{\eta} \tag{7}$$

The formula (1) and a formula (7) are combined to yield:

$$MJ^{-1}(\varphi)\ddot{\eta} + (M\dot{j}^{-1}(\varphi) + DJ^{-1}(\varphi))\dot{\eta} = \tau - d \tag{8}$$

A formula (9) and a formula (10) are introduced:

$$P = MJ^{-1}(\varphi) \tag{9}$$

$$Q = M\dot{j}^{-1}(\varphi) + DJ^{-1}(\varphi) \tag{10}$$

Then, the formula (8) may be simplified as:

$$P\ddot{\eta} + Q\dot{\eta} = \tau - d \tag{11}$$

$$\begin{cases} x_1 = \eta \\ \dot{x}_1 = \dot{\eta} \end{cases}$$

is taken, and $$x = \begin{bmatrix} x_1 \\ x_2 \end{bmatrix} = \begin{bmatrix} \eta \\ \dot{\eta} \end{bmatrix},$$

and a formula (11) is converted into a state equation, that is, a formula (12):

$$\begin{cases} \dot{x}_1 = x_2 \\ \dot{x}_2 = -P^{-1}Qx_2 + P^{-1}\tau - P^{-1}d. \\ y = x_1 \end{cases} \quad (12)$$

It may be understood that there is also an uncertainty in the formula (1), so the formula (12) is converted into a formula (13):

$$\begin{cases} \dot{x}_1 = x_2 \\ \dot{x}_2 = ax_2 + b\tau + c \\ y = x_1 \\ F = \Delta_1 x_2 + \Delta_2 \tau - P^{-1}\tau \end{cases} \quad (13)$$

$$a = P^{-1}Q, b = P^{-1}, c = F,$$

where F represents the uncertainty, and $|F|<\bar{F}$; $\Delta_1$ and $\Delta_2$ both represent a parameter uncertainty.

In order to effectively observe a state of the system, an extended state observer (ESO) suitable for the dynamic positioning model is constructed. Considering an uncertainty of modeling and the external interference, the formula (13) is converted into a formula (14):

$$\begin{cases} \dot{x} = Ax + B\tau + C \\ y = x \end{cases} \quad (14)$$

$$A = \begin{bmatrix} 0 & 1 \\ 0 & a \end{bmatrix}, B = \begin{bmatrix} 0 \\ b \end{bmatrix}, C = \begin{bmatrix} 0 \\ c \end{bmatrix}.$$

A formula (15) of an ESO structure, that is, the virtual observer model, is constructed based on the dynamic positioning model.

$$\dot{\hat{x}} = A\hat{x} + B\tau H(y - \hat{x}) \quad (15).$$

According to the formula (14) and the formula (15), an error model corresponding to the virtual observer model is:

$$\dot{\tilde{x}} = (A - H)\tilde{x} + C$$

$$\tilde{x} = x - \hat{x}, \quad (16)$$

where, $\tilde{x}$ represents an estimation error.

Further, in an implementation provided by the embodiments of the application, the preset neural network model includes a radial basis function (RBF) neural network model.

Understandably, the radial basis function neural network model has advantages of a good approximation effect, a simple and efficient training, a fast learning speed and a convergence speed, and may overcome local optima, and is often used to approximate continuous functions.

Therefore, in this implementation, in the embodiments of the application, the radial basis function neural network model is used to approximate the uncertainty in the virtual observer model, thereby eliminating errors in the virtual observer model.

Optionally, a calculation process of the radial basis function neural network model may with reference to following formulas:

$$h_j = \exp\left(\frac{\|x - c_j\|^2}{-2b_j^2}\right)$$

$$F = W^{*T}h(x) + \epsilon$$

$$\hat{F} = \hat{W}^{*T}h(x),$$

where h(x) is a transposition of $h_j$, and h(x) represents an activation function of the radial basis function neural network model; x represents an input of the radial basis function neural network model; j is a node of a hidden layer of the network; W* represents a weight of the radial basis function neural network model; $\epsilon$ represents an approximation error of the radial basis function neural network model, and $|\epsilon|<\epsilon_N$, and $\epsilon_N$ represents a minimal normal number; $\hat{F}$ is an output value of the network, that is, the uncertainty.

Further, in an implementation provided by the embodiments of the application, before updating the virtual observer model by using the preset neural network model to compensate the uncertainty in the virtual observer model, the method includes:

determining an adaptability of the preset neural network model according to the dynamic positioning model and the virtual observer model.

Updating the virtual observer model by using the preset neural network model includes:

updating the virtual observer model by using the preset neural network model based on the adaptability.

That is, a corresponding preset condition, that is, the adaptability, are set according to the dynamic positioning model and the virtual observer model, so as to make the output of the preset neural network model, that is, the radial basis function neural network model, conform to data characteristics of the dynamic positioning model and the virtual observer model.

S140, each of the propellers is controlled to generate a thrust according to the corresponding first target thrust torque, and an actual thrust torque of each of the propellers is detected by using the second torque detector/controlling each of the propellers to generate a thrust according to the corresponding first target thrust torque, and detecting an actual thrust torque of each of the propellers by using the second torque detector.

Understandably, when the propellers are controlled to generate thrusts to offset the external environmental interference, if the propellers fail and an expected reaction force may not be generated, that is, the actual thrust torque is not the corresponding first target thrust torque, a stability of the semi-submersible offshore platform may not be realized. Therefore, in the embodiments of the application, while each of the propellers is controlled to generate the thrust, a second torque detector is also controlled to detect the actual thrust torque of each of the propellers to determine whether each of the propellers may generate the corresponding first target thrust torque.

S150, if an actual thrust torque of at least one of the propellers is different from a corresponding first target thrust torque, a fault condition of each of the propellers is obtained, where the fault condition is obtained by the actual thrust torque and the corresponding first target thrust torque.

It may be understood that the actual thrust torque of the propeller is different from the corresponding first target thrust torque, which indicates that the propeller has failed. Therefore, the fault condition of each of the propellers needs to be considered at this time.

Figure 2:
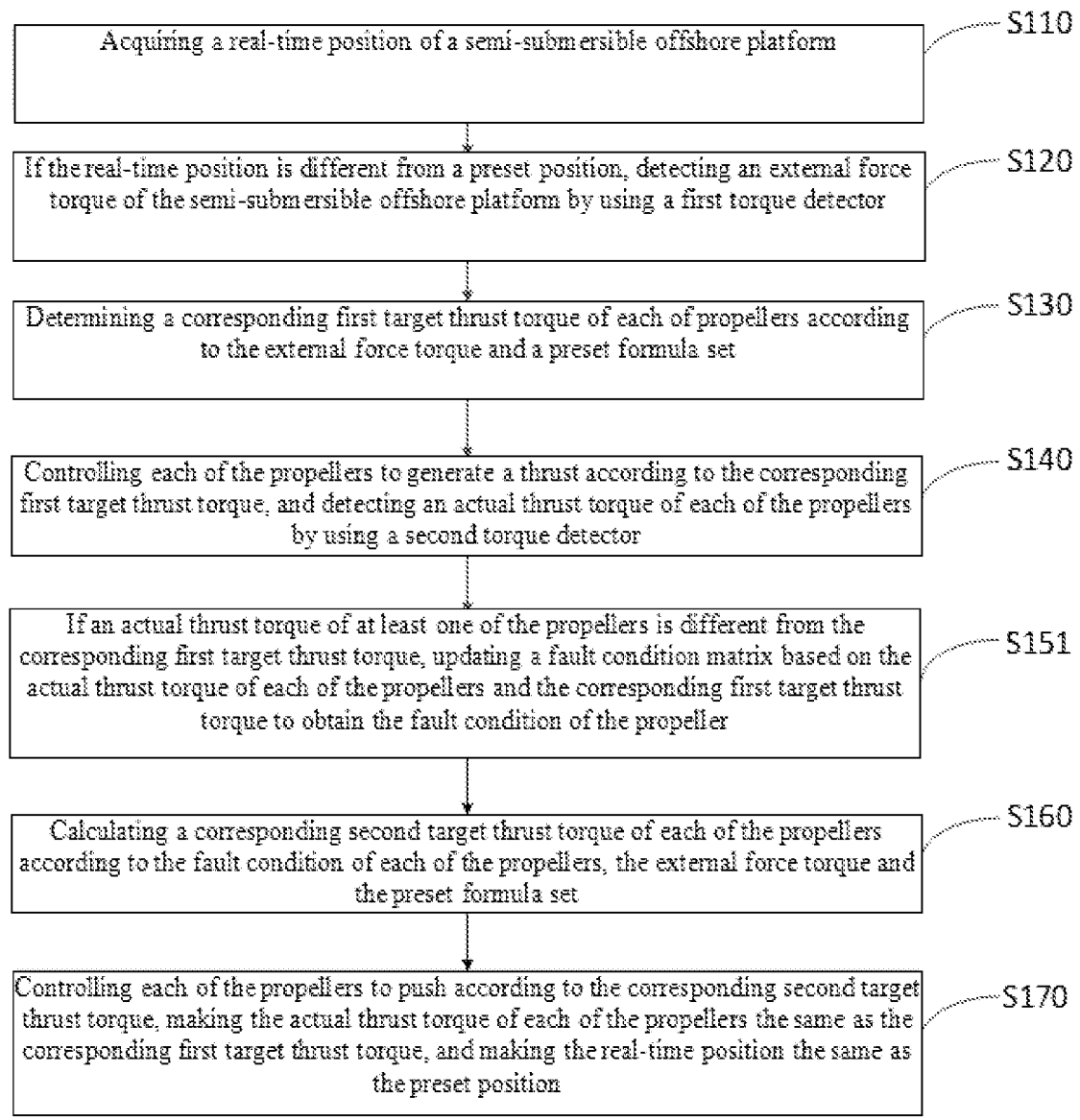
FIG. 2 shows a flow chart of a second dynamic positioning method of a semi-submersible offshore platform provided by an embodiment of the application.

Optionally, with reference to FIG. 2, a flow chart of a second dynamic positioning method of a semi-submersible offshore platform provided by the embodiments of the application is shown, that is, in an implementation provided by the embodiments of the application, when the fault condition of the propeller is described by $\lambda_r$ in the thrust distribution model, the S150 includes:

S151: if the actual thrust torque of at least one propeller is different from the corresponding first target thrust torque, updating the fault condition matrix according to the actual thrust torque of each of the propellers and the corresponding first target thrust torque to obtain the fault condition of the propeller.

It may be understood that in this implementation, when calculating the first target thrust torque, the fault condition $\lambda_r$ of each of the propellers in the fault condition matrix K is 1, that is, the fault condition of each of the propellers is no fault by default.

However, when the actual thrust torque of at least one of the propellers is different from the corresponding first target thrust torque, the fault condition is determined by the actual thrust torque of each of the propellers and the corresponding first target thrust torque according to a calculation formula of $\lambda_r$, and the fault condition matrix K is updated, so as to obtain the fault condition of each of the propellers.

S160, the corresponding second target thrust torque of each of the propellers is calculated according to the fault condition of each of the propellers, the external force torque and the preset formula set.

When determining a propeller with a fault in the preset number of propellers, a new target thrust torque corresponding to each of the propellers, that is, the second target thrust torque, maybe recalculated according to the fault condition. It should be understood that a purpose of calculating the second target thrust torque is to make the actual thrust torque of each of the propellers the same as the corresponding first target thrust torque when generating a thrust based on the second target thrust torque, and then offset the external force torque.

S170, each of the propellers is controlled to push according to the corresponding second target thrust torque, so as to make the actual thrust torque of each of the propellers the same as the corresponding first target thrust torque, and make the real-time position the same as the preset position.

After recalculating the new target thrust torque of each of the propellers, each of the propellers is controlled to generate a thrust based on the new target thrust torque. It may be understood that in a calculation process of the new target thrust torque, that is, the second target thrust torque, the fault condition of the propeller is taken into account, and when the propeller generates a thrust based on the second target thrust torque, an actual thrust generated by the propeller may be ensured, and the actual thrust torque may be consistent with the first target thrust torque, so that the real-time position of the semi-submersible offshore platform is the same as the preset position.

Therefore, according to the dynamic positioning method of the semi-submersible offshore platform provided by the embodiments of the application, the external force of the semi-submersible offshore platform is directly measured through the first torque detector, thereby ensuring an accuracy of a subsequent calculation of the first target thrust torque and the second target thrust torque. Moreover, the fault condition of each of the propellers is determined by the first target thrust torque and the actual thrust torque of each of the propellers detected by the second torque detector, and the target thrust is recalculated according to the fault condition, that is, the thrust is redistributed, so that the semi-submersible offshore platform may be positioned even when the propellers are faulty, and the stability of the semi-submersible offshore platform and a smooth exploitation of resources are ensured.

Figure 3:
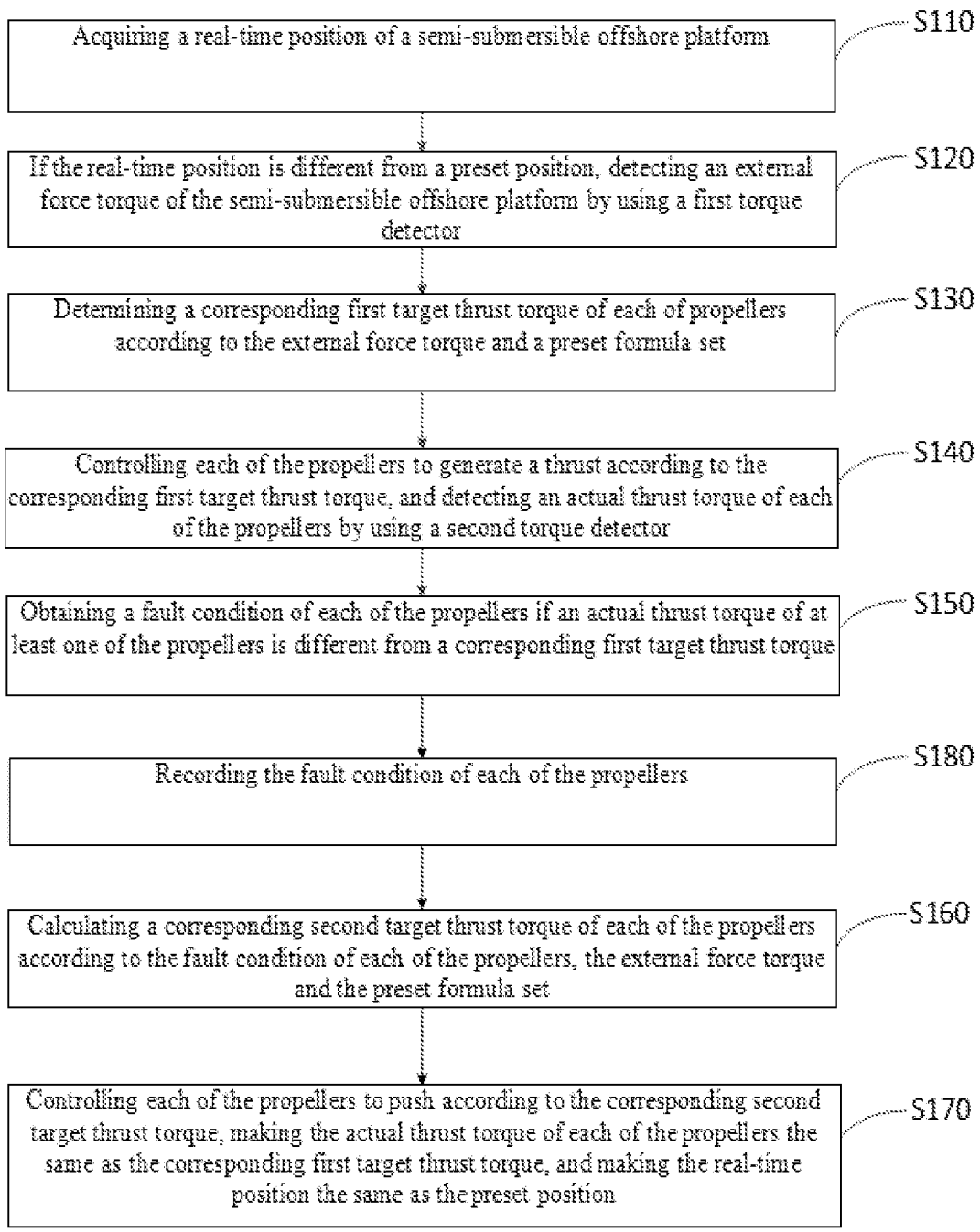
FIG. 3 shows a flow chart of a third dynamic positioning method of a semi-submersible offshore platform provided by an embodiment of the application.

Optionally, with reference to FIG. 3, a flow chart of a third dynamic positioning method of a semi-submersible offshore platform provided by the embodiments of the application is shown. After the S150, the method further includes:

S180, recording the fault condition of each of the propellers.

The fault condition of each of the propellers is recorded, and then when a next real-time position of the semi-submersible offshore platform is different from the preset position, the first target thrust may be calculated directly through a recorded fault condition of each of the propellers, so as to make the semi-submersible offshore platform fast and stable.

It should also be noted that the embodiments of the application only require the S180 to be executed after the S150, that is, the S180 may be executed before and after any step after the S150.

In order to better explain the dynamic positioning method of the semi-submersible offshore platform provided by the embodiments of the application, the embodiments of the application provide a process of determining the control rate $\tau$ of the propeller by using each formula in the preset formula set.

A position command, that is, a target position of the semi-submersible offshore platform to be moved is set as $x_d$, a tracking error $z_1$ is defined and a differential is calculated to obtain a formula (17):

$$\begin{cases} z_1 = x_1 - x_d \\ \dot{z} = x_2 - \dot{x}_d \end{cases} \quad (17)$$

A virtual control item $z_2$ is introduced and $x_2 = z_2 + \dot{x}_d - c_1 z_1$ is defined, where $c_1$ is a normal number. Then, $\dot{z}_1 = x_2 - \dot{x}_d = z_2 - c_1 z_1$.

A first Lyapunov function is defined, namely a formula (18):

$$V_1 = \frac{1}{2} z_1^T z_1. \quad (18)$$

The formula (18) is derived to obtain a formula (19):

$$\dot{V}_1 = z_1 z_2 - c_1 z_1^2 \quad (19).$$

A sliding surface formula is designed, namely a formula (20):

$$s = k_1 z_1 + z_2 \quad (20).$$

$k_1 > 0$

Since $\dot{z}_1 = z_2 - c_1 z_1$, the formula (20) is converted into a formula (21):

$$s = (k_1 + c_1) z_1 + \dot{z}_1 \quad (21).$$

Since $k_1 + c_1 > 0$, if $s = 0$, then $z_1 = 0$, $z_2 = 0$ and $\dot{V}_1 \leq 0$.

A second Lyapunov function is defined, namely a formula (22):

$$V_2 = V_1 + \frac{1}{2} s^t s + \frac{1}{2\gamma} \tilde{W}^T \dot{\tilde{W}}. \quad (22)$$

Then:

$$\dot{V}_2 = \dot{V}_1 + s\dot{s} - \frac{1}{\gamma}\tilde{W}^T\dot{\hat{W}} = z_1 z_2 - c_1 z_1^2 - s\dot{s} - \frac{1}{\gamma}\tilde{W}^T\dot{\hat{W}}, \quad (23)$$

where:

$$\dot{s} = k_1\dot{z}_1 + \ddot{z} = k_1(z_2 - c_1 z_1) + (\dot{x}_2 + \ddot{x}_d + c_1\dot{z}_1) \quad (24).$$

It should be noted that $\hat{F}$ is an estimated value of F and an estimation error of F is $\tilde{F} = F - \hat{F}$. Assuming that an uncertain part of parameters and the external interference change slowly, $\dot{F} = 0$ is taken.

Then, the formula (13), the formula (19) and the formula (24) are brought into the formula (23) to obtain τ as:

$$\tau = P(-k_1(z_2 - c_1 z_1) + P^{-1}Q(z_2 + \dot{x}_d - c_1 z_1) - \hat{F} + \ddot{x}_d - c_1\dot{z}_1 - h(s + \beta \operatorname{sgn}(s))).$$

Figure 4:
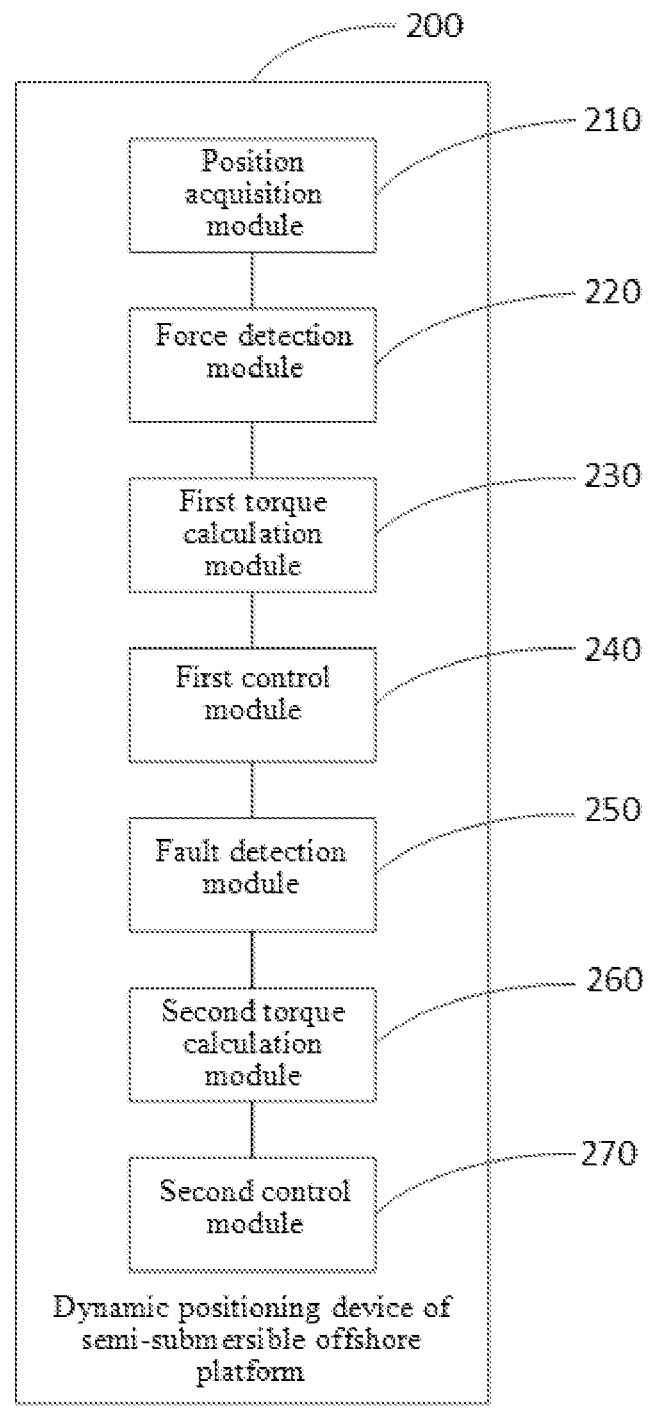
FIG. 4 shows a structural schematic diagram of a dynamic positioning device of a semi-submersible offshore platform provided by an embodiment of the application.

Corresponding to the dynamic positioning method of the semi-submersible offshore platform provided by the embodiments of the application, the embodiments of the application also provide a dynamic positioning device of a semi-submersible offshore platform. With reference to FIG. 4, a structural schematic diagram of the dynamic positioning device of the semi-submersible offshore platform provided by the embodiments of the application is shown in FIG. 4. In a dynamic positioning device 200 of a semi-submersible offshore platform provided by the embodiments of the application, the semi-submersible offshore platform is provided with a first torque detector, a second torque detector and a preset number of propellers. The device includes:
- a position acquisition module 210, configured to acquire a real-time position of the semi-submersible offshore platform;
- a force detection module 220, configured to detect an external force torque of the semi-submersible offshore platform by using the first torque detector if the real-time position is different from a preset position;
- a first torque calculation module 230, configured to determine a corresponding first target thrust torque of each of the propellers according to the external force torque and a preset formula set;
- a first control module 240, configured to control each of the propellers to generate a thrust according to the corresponding first target thrust torque, and detecting an actual thrust torque of each of the propellers by using the second torque detector;
- a fault detection module 250, configured to obtain a fault condition of each of the propellers if an actual thrust torque of at least one of the propellers is different from a corresponding first target thrust torque, where the fault condition is obtained from the actual thrust torque and the corresponding first target thrust torque;
- a second torque calculation module 260, configured to calculate a corresponding second target thrust torque of each of the propellers according to the fault condition of each of the propellers, the external force torque and the preset formula set; and
- a second control module 270, configured to control each of the propellers to push according to the corresponding second target thrust torque, making the actual thrust torque of each of the propellers the same as the corresponding first target thrust torque, and making the real-time position the same as the preset position.

The dynamic positioning device 200 of the semi-submersible offshore platform provided by the embodiments of the present application may realize each process of the dynamic positioning method of the semi-submersible offshore platform in a method embodiment disclosed in FIG. 1, and may achieve a same technical effect. To avoid repetition, the device is not repeated here.

The embodiments of the application also provide a computer device, including a memory and a processor, where the memory stores a computer program, and when the computer program runs on the processor, the dynamic positioning method of the semi-submersible offshore platform disclosed in a corresponding method embodiment of FIG. 1 is executed.

The embodiments of the application also provide a computer-readable storage medium, where a computer program is stored on the computer-readable storage medium, and when the computer program runs on the processor, the dynamic positioning method of a semi-submersible offshore platform as disclosed in a corresponding method embodiment of FIG. 1 is executed.

In several embodiments provided by this application, it should be understood that the disclosed devices and methods may also be realized in other ways. The device embodiments described above are only schematic. For example, flow charts and structural diagrams in the drawings show architectures, functions and operations of possible implementations of devices, methods and computer program products according to various embodiments of the application. In this regard, each block in the flow charts or block diagrams may represent a module, a program segment or a part of codes, the module, the program segment or the part of the codes contains one or more executable instructions for implementing specified logical functions. It should also be noted that in alternative implementations, the functions noted in blocks may also occur in a different order than those noted in the drawings. For example, two consecutive blocks may actually be executed substantially in parallel, and the two consecutive blocks may sometimes be executed in a reverse order, depending on functions involved. It should also be noted that each block in the block diagrams and/or the flow charts, and combinations of the blocks in the block diagrams and/or the flow charts, may be realized by a dedicated hardware-based system that performs specified functions or actions, or may be realized by a combination of a dedicated hardware and computer instructions.

In addition, each functional module or unit in each embodiment of the application may be integrated to form an independent part, or each module may exist alone, or two or more modules may be integrated to form an independent part.

If the functions are realized in a form of software functional module and sold or used as independent products, the functions may be stored in a computer-readable storage medium. Based on this understanding, the technical schemes of the application, in essence, or a part that contributes to the prior art, or a part of the technical schemes, may be reflected in a form of software product. The computer software product is stored in a storage medium and includes several instructions to make a computer device (which may be a smart phone, a personal computer, a server, or a network device, etc.) execute all or a part of the steps of the methods described in various embodiments of the application. The aforementioned storage media include: a U disk, a mobile hard disk, a read-only memory (ROM), a random access memory (RAM), a magnetic disk or an optical disk and other media that may store program codes.

The above is only specific embodiments of the application, but the scope of protection of the application is not limited thereto. Any changes or substitutions that may easily be thought of by any skilled person in this art within a technical scope disclosed by the application should fall in the scope of protection of the application.

What is claimed is:

1. A dynamic positioning method of a semi-submersible offshore platform, wherein a first torque detector, a second torque detector and a preset number of propellers are arranged in the semi-submersible offshore platform, and the method comprises:
   acquiring a real-time position of the semi-submersible offshore platform;
   if the real-time position is different from a preset position, detecting an external force torque of the semi-submersible offshore platform by using the first torque detector;
   determining a corresponding first target thrust torque of each of the propellers according to the external force torque and a preset formula set;
   controlling each of the propellers to generate a thrust according to the corresponding first target thrust torque, and detecting an actual thrust torque of each of the propellers by using the second torque detector;
   obtaining a fault condition of each of the propellers if an actual thrust torque of at least one of the propellers is different from a corresponding first target thrust torque, wherein the fault condition is obtained by the actual thrust torque and the corresponding first target thrust torque;
   calculating a corresponding second target thrust torque of each of the propellers according to the fault condition of each of the propellers, the external force torque and the preset formula set; and
   controlling each of the propellers to push according to the corresponding second target thrust torque, making the actual thrust torque of each of the propellers the same as the corresponding first target thrust torque, and making the real-time position the same as the preset position.

2. The method according to claim 1, wherein the preset formula set comprises a thrust distribution model, a dynamic positioning model and a virtual observer model; and
   before determining the corresponding first target thrust torque of each of the propellers according to the external force torque and the preset formula set, the method comprises:
   constructing the thrust distribution model based on a position of each of the propellers;
   constructing the dynamic positioning model corresponding to the semi-submersible offshore platform according to a three-degree-of-freedom dynamic positioning ship modeling principle;
   determining the virtual observer model based on the dynamic positioning model, wherein the virtual observer model is used for estimating a speed and a position of the semi-submersible offshore platform; and
   updating the virtual observer model by using a preset neural network model to compensate an uncertainty in the virtual observer model.

3. The method according to claim 2, wherein obtaining the fault condition of each of the propellers if the actual thrust torque of at least one of the propellers is different from the corresponding first target thrust torque comprises:
   if the actual thrust torque of at least one of the propellers is different from the corresponding first target thrust torque, updating a fault condition matrix according to the actual thrust torque of each of the propellers and the corresponding first target thrust torque to obtain fault conditions of the propellers, wherein the fault condition matrix is used for representing the fault condition of each of the propellers.

4. The method according to claim 2, wherein the preset neural network model comprises a radial basis function neural network model.

5. The method according to claim 4, wherein before updating the virtual observer model by using the preset neural network model, the method comprises:
   determining an adaptability of the preset neural network model according to the dynamic positioning model and the virtual observer model, wherein
   updating the virtual observer model by using the preset neural network model comprises:
   updating the virtual observer model by using the preset neural network model based on the adaptability.

6. The method according to claim 1, wherein after obtaining the fault condition of each of the propellers if the actual thrust torque of at least one of the propellers is different from the corresponding first target thrust torque, the method further comprises:
   recording the fault condition of each of the propellers.

7. A dynamic positioning device of a semi-submersible offshore platform, wherein a first torque detector, a second torque detector and a preset number of propellers are arranged in the semi-submersible offshore platform, and the device comprises:
   a position acquisition module, configured to acquire a real-time position of the semi-submersible offshore platform;
   a force detection module, configured to detect an external force torque of the semi-submersible offshore platform by using the first torque detector if the real-time position is different from a preset position;
   a first torque calculation module, configured to determine a corresponding first target thrust torque of each of the propellers according to the external force torque and a preset formula set;
   a first control module, configured to control each of the propellers to generate a thrust according to the corresponding first target thrust torque, and detecting an actual thrust torque of each of the propellers by using the second torque detector;
   a fault detection module, configured to obtain a fault condition of each of the propellers if an actual thrust torque of at least one of the propellers is different from a corresponding first target thrust torque, wherein the fault condition is obtained from the actual thrust torque and the corresponding first target thrust torque;
   a second torque calculation module, configured to calculate a corresponding second target thrust torque of each of the propellers according to the fault condition of each of the propellers, the external force torque and the preset formula set; and
   a second control module, configured to control each of the propellers to push according to the corresponding second target thrust torque, making the actual thrust torque of each of the propellers the same as the corresponding first target thrust torque, and making the real-time position the same as the preset position.

8. A computer device, comprising a memory and a processor, wherein the memory stores a computer program, and when the computer program runs on the processor, the dynamic positioning method of the semi-submersible offshore platform according to claim 1 is executed.

* * * * *